J. E. GOODWILL.
LOCKING MEANS FOR MOTOR VEHICLES.
APPLICATION FILED SEPT. 28, 1918.
1,305,277.
Patented June 3, 1919.
2 SHEETS—SHEET 1.
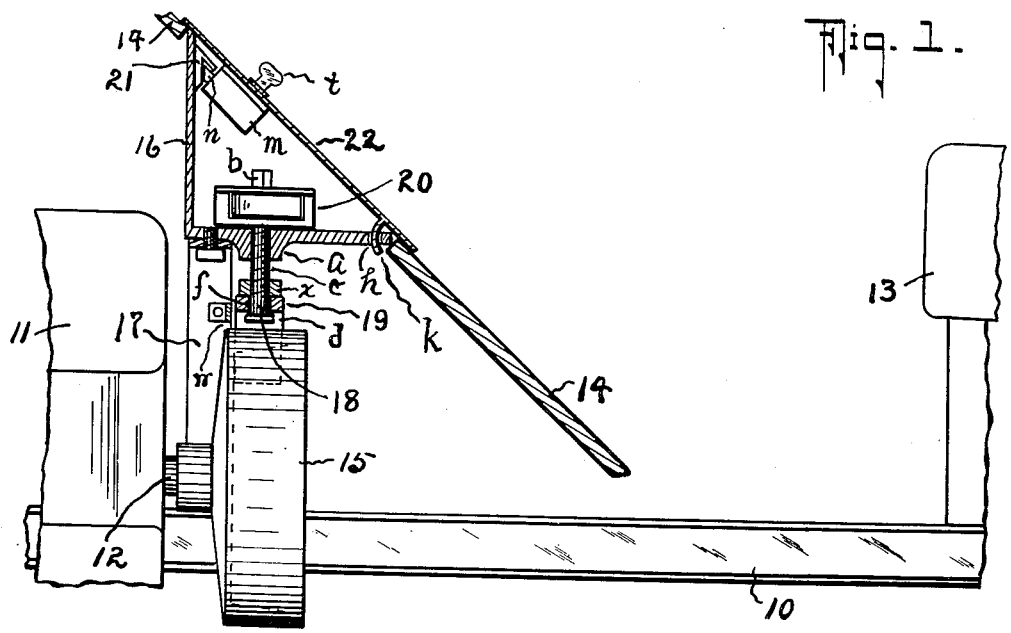
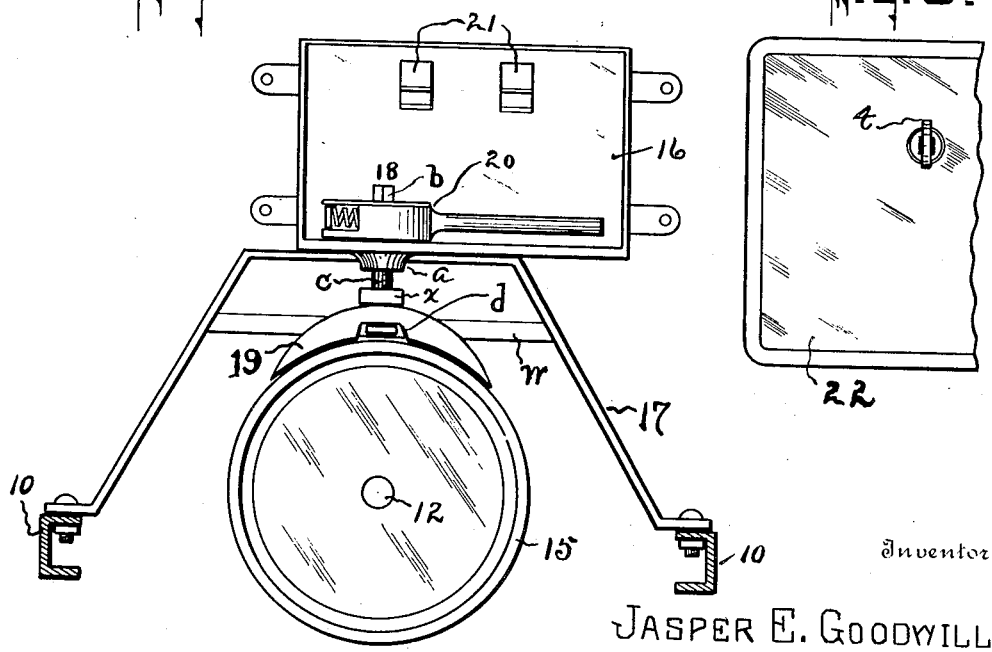
Inventor
JASPER E. GOODWILL.
By Arthur H. Sturges.
Attorney

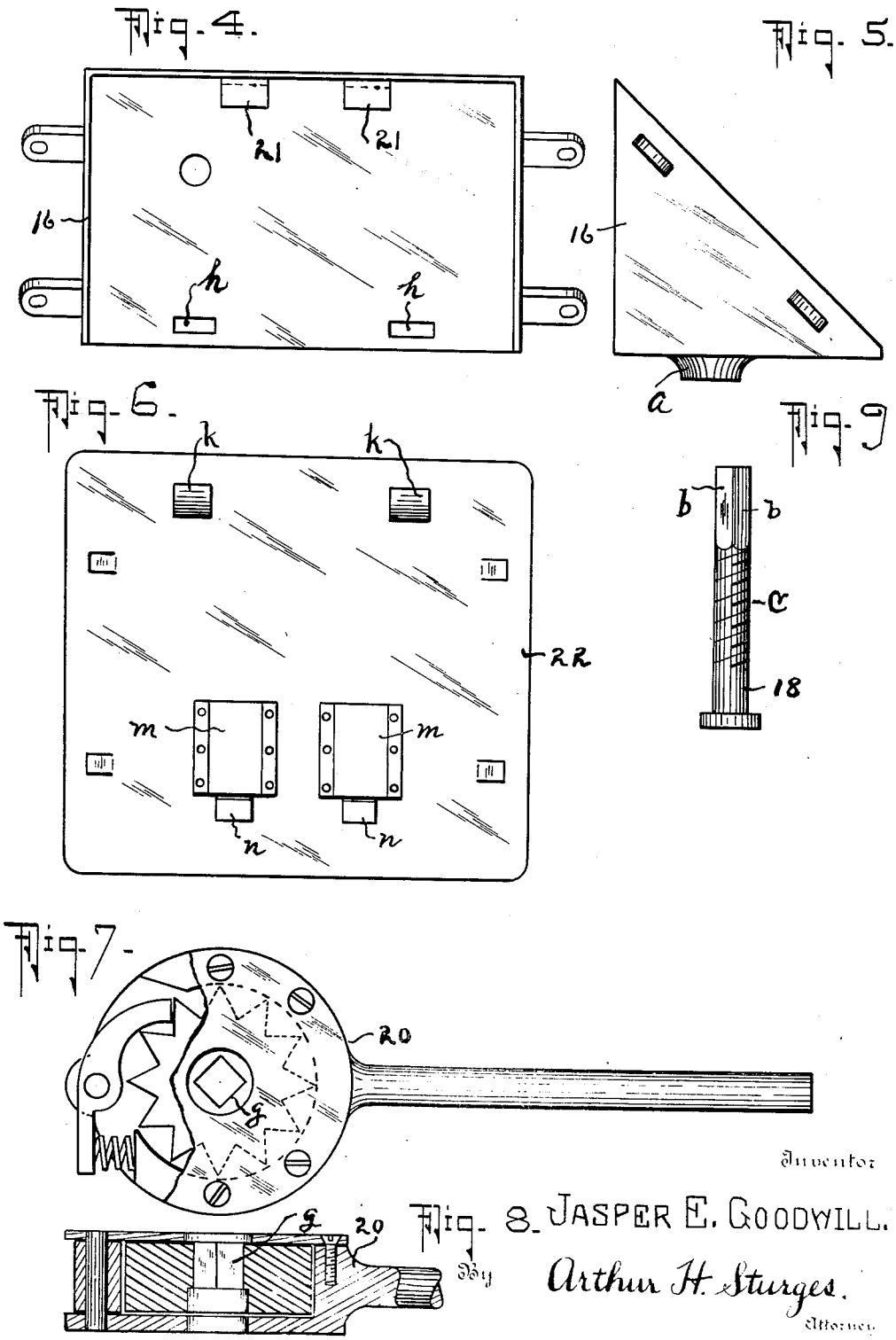

UNITED STATES PATENT OFFICE.

JASPER E. GOODWILL, OF OMAHA, NEBRASKA.

LOCKING MEANS FOR MOTOR-VEHICLES.

1,305,277.   Specification of Letters Patent.   Patented June 3, 1919.

Application filed September 28, 1918. Serial No. 256,010.

*To all whom it may concern:*

Be it known that I, JASPER E. GOODWILL, a citizen of the United States, residing at Omaha, in the county of Douglas and State of Nebraska, have invented certain new and useful Improvements in Locking Means for Motor-Vehicles, of which the following is a specification.

This invention relates to a locking means for motor vehicles, and has for its object to provide such an arrangement of parts that the revoluble shaft and fly-wheel of automobiles or similar vehicles may be readily locked or maintained in a stationary position to prevent use of the vehicle by unauthorized persons, the parts to be few and of simple construction so that manufacture will be economical, and that they will be fully effective and operative for the purpose mentioned.

The invention broadly includes a brake shoe used in combination with the fly wheel, and means to control the brake shoe for its engagement or disengagement with the fly wheel for preventing or permitting operation of the engine and fly wheel. The novel features of the invention are fully described herein and pointed out in the appended claims and illustrated in the accompanying drawing, wherein,—

Figure 1 is a broken away side view showing the front part of an automobile frame, a stationary container for housing certain locking devices being in section. Fig. 2 is a detail relating to Fig. 1 being a rear view of the fly wheel, the lid for the container being removed. Fig. 3 is a view showing a part of the outer side of the lid of the container. Fig. 4 is a plan view of the housing receptacle its lid being removed. Fig. 5 is an end view of the parts shown in Fig. 4. Fig. 6 is a bottom plan view of the lid. Fig. 7 is a broken away plan view of a wrench. Fig. 8 is a sectional view of the wrench-head. Fig. 9 is a view of a screw-bolt.

The invention is described in connection with the frame, engine and engine shaft indicated respectively at 10, 11 and 12 of a motor vehicle, the conventional seat and inclined floor for the vehicle being indicated respectively at 13 and 14 and the usual fly wheel for the engine shaft 12 being indicated at 15.

I provide a box or receptacle 16 its bottom preferably having a boss $a$, said receptacle being adapted to be supported with the boss disposed diametrically above the middle of the fly wheel upon a suitable frame 17, which is mounted upon and projects above the vehicle frame 10, said receptacle 16 also being supported in part by the inclined floor 14.

The particular mounting of the receptacle 16 is not important but its boss $a$ which is interiorly threaded should be maintained stationary and in spaced relation with reference to its distance from the fly-wheel 15. Numeral 18 indicates a bolt provided at one of its ends with facets $b$ and threaded between its ends as indicated at $c$.

Numeral 19 indicates a brake-shoe of segmental form having a recess $d$ midway between its ends in which the head of the bolt 18 engages, and provided with an aperture $f$ opening on said recess for receiving the bolt.

Any suitable control-device may be used for causing a limited rotatable movement of the bolt 18, as the wrench 20 having an aperture $g$ angular in plan for receiving the end of the bolt 18, said wrench 20 preferably being provided with a pawl and ratchet as plainly shown in the drawing for conveniently effecting a sufficient rotation of the bolt 18 to cause engagement or disengagement of the shoe with the periphery of the fly-wheel, said bolt preferably being "coarse-threaded" so that a very limited movement of the wrench will cause a sufficient movement of the bolt to cause said engagement or disengagement.

Numerals 21 indicate projections or catches provided for the vertical wall of the receptacle 16, the bottom of said receptacle, as best shown in Figs. 1 and 4, being provided with aperture $h$. Numeral 22 indicates a lid adapted to be disposed parallel with and approximately in line with the inclined floor 14. It is provided adjacent to one of its edges with catches $k$ adapted to engage in apertures $h$, and said lid is provided, adjacent to its edge, opposite to the catches $k$, with a pair of locks $m$ having bolts $n$ adapted to engage the projections or catches 21 of the receptacle 16, said locks and catches $k$ being mounted on the inner side of the lid.

At $x$ is indicated a screw-block or nut which is mounted on the bolt 18, its mounting on the bolt being sufficiently rigid to prevent any rotatable movement thereon when the bolt is rotated by the wrench for causing engagement or disengagement of the brake-shoe with the fly wheel. In order that a transverse sliding movement of the brake-shoe may be prevented, the frame 17 is provided with a brace-bar w which is disposed adjacent to the side of the brake-shoe and parallel therewith.

In operation, to lock the parts so that the vehicle could not be used by an unauthorized person, the operator, after removing the lid 22 from the inclined floor 14 causes the bolt 18 to rotate in a limited arc by use of the wrench 20 to cause the brake shoe 19 to be pressed against the periphery of the fly wheel. He then replaces the lid 22 in its inclined position with its catches k engaging in recesses h, and by use of keys t the bolts n will engage the catches 21, which prevents access to the receptacle for changing the position of the brake-shoe.

The operation for unlocking consists in using the keys t to permit removal of the lid 22, and thereafter by use of the wrench 20 the brake-shoe may be elevated so that it will not engage the fly wheel.

Among some of the advantages to be derived by use of the invention, it may be stated that the parts are so located that they do not interfere with operation in the management of an automobile which is considered to be a matter of importance. Also the parts are few and simple and may be manufactured at a nominal expense, and operate to effectively prevent use of an automobile except by consent and coöperation of the owner.

While I have described construction in detail, I do not wish to be understood as limiting myself to size, form, proportion or minor details, and therefore I may make certain changes in said construction as may be hereafter found to be of advantage, provided, of course, that such changes are within the scope of the invention as claimed.

I claim,—

1. In a locking-means for a vehicle having an engine shaft and a fly wheel, a receptacle provided with a lid and having an interiorly threaded part disposed in stationary spaced relation with reference to the periphery of the fly wheel, a brake-shoe, a bolt engaging the brake-shoe and the threaded part of the receptacle and projecting within the latter, control-devices within the receptacle for rotating the bolt for moving the brake-shoe into engagement with the periphery of the fly wheel, and means for securing the lid in locked relation with the receptacle.

2. In a locking means for a vehicle having an engine shaft and a fly wheel and an inclined floor above the fly-wheel, a receptacle having a lid normally disposed parallel and approximately in line with said inclined floor, said receptacle having an interiorly threaded part disposed in spaced relation with reference to the fly-wheel, a brake-shoe, a bolt engaging the threaded part of the receptacle and said brake-shoe, a wrench-member within the receptacle for rotating the bolt to cause engagement of the brake-shoe with the fly wheel, and means for securing the lid in locked relation with said receptacle.

3. In a locking means for a vehicle having a revoluble member and a floor above said revoluble member, a box having a lid normally disposed in line with the floor and provided with an interiorly threaded boss disposed above said revoluble member, a contact-member, a threaded bolt traversing the boss of said receptacle and engaging the contact-member for actuating the bolt to cause engagement of the contact-member with said revoluble member, and locking devices for securing the lid upon said box.

4. In a locking means for the fly wheel of a motor vehicle, a receptacle provided with a lid and having a bottom provided with an apertured boss disposed above and in stationary relation with reference to the fly wheel, a brake-shoe, a bolt pivotally mounted on the brake-shoe and threaded in the aperture of said boss, control-devices within the receptacle to adjust the bolt longitudinally for moving the brake-shoe into engagement with the fly wheel, means for preventing a transverse swinging movement of the pivotally mounted brake-shoe while it is moving into engagement with the fly-wheel, and means for securing the lid and said receptacle in locked relation.

In testimony whereof, I have affixed my signature in presence of two witnesses.

JASPER E. GOODWILL.

Witnesses:
ARTHUR H. STURGES,
HIRAM A. STURGES.